J H Manny,
Mower.

No 12.825   Patented May 8. 1855

UNITED STATES PATENT OFFICE.

JOHN H. MANNY, OF ROCKFORD, ILLINOIS.

IMPROVEMENT IN GRAIN AND GRASS HARVESTERS.

Specification forming part of Letters Patent No. 12,825, dated May 8, 1855.

*To all whom it may concern:*

Be it known that I, JOHN H. MANNY, of Rockford, in the county of Winnebago and State of Illinois, have invented a new and useful Improvement in Reaping and Mowing Machines, of which the following is a full, clear, and exact description, reference being had to the accompanying drawings of the same, which make part of the specification, and in which—

Figure 1:
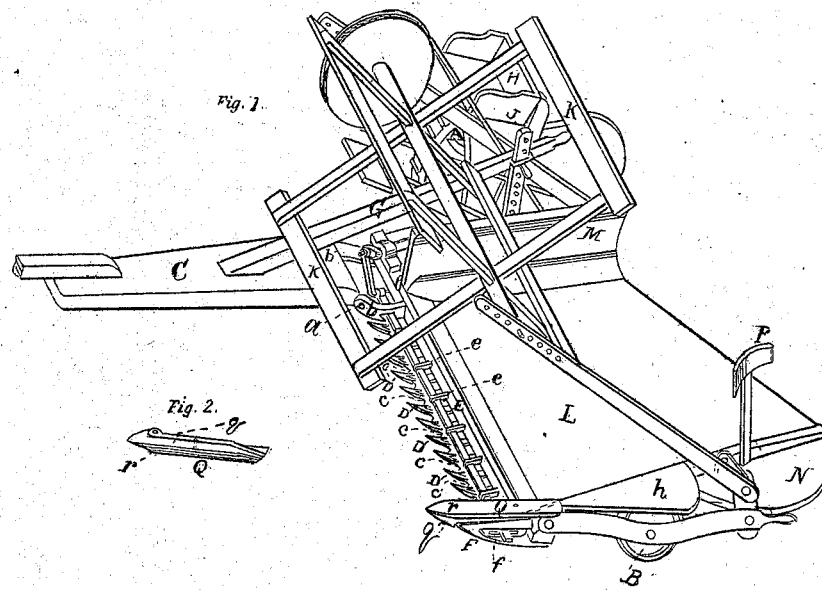
Figure 2:
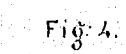
Figure 4:
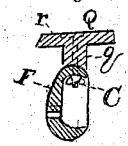
Figure 3:
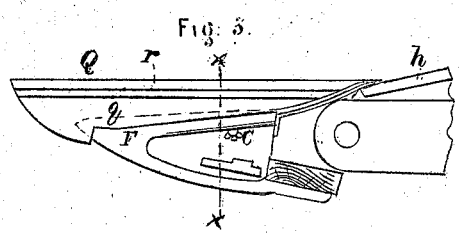
Figure 5:
Figure 5:
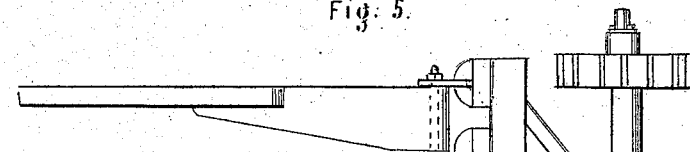

Figure 1 represents a view in perspective of one of my harvesting-machines with a removable auxiliary divider applied thereto, which is the subject of the present patent. Fig. 2 represents a view in perspective of the auxiliary divider detached from the fixed divider and turned bottom uppermost. Fig. 3 is a view upon an enlarged scale of the left front corner of the machine to show more clearly the manner in which the fixed and auxiliary dividers are constructed and connected. Fig. 4 represents a tranverse section of the same at line $xx$; and Fig. 5 represents a view of a modified form of my triangular frame, (patented September 23, 1851, and the patent for which was reissued January 2, 1855,) to which the fixed and auxiliary dividers are applied.

The fixed divider A is of peculiar construction; but as it is fully described in Letters Patent granted to me for it on the 17th day of October, 1854, antedated June 15, 1854, it is unnecessary here to repeat the description in detail. This divider projects about twelve inches in advance of the finger-bar, and is about four inches wide, being fully adequate to the division of grass, and even grain of moderate growth, which is not lodged, and wherever this divider will answer the purpose, one longer, wider, or more extensive would be injurious, as the divider tends to break down the straw in proportion to its size. Hence the smallest divider that will effect the necessary separation is the best, other things being equal, as it will break down the least grain. It however happens that grain is often lodged and entangled in such manner that a wider and more complete separation of that which is to be cut from that which is to be left standing is necessary, even at the expense of breaking down the stalks considerably by a too great bending or deflection of them to one side by reason of the increased width of the divider, which is necessary under these circumstances.

In order to supply the machine with this more extensive divider when necessary, without being compelled to use it when it would be a disadvantage to do so, I have contrived the auxiliary divider Q, to be applied to the small fixed divider F, which auxiliary divider is placed over and fits upon the smaller one, and is fastened by a bolt and thumb-nut, C, or in some other way by which it can be conveniently detached and reapplied, as required. The large auxiliary divider Q may be made of the form represented in the drawings, which consists of a rib or board, $q$, which is fitted to the top and the point of the fixed divider, as represented, and stands on edge, and a wedge-shaped board, $r$, attached by one side to the upper edge of the rib, the points of the two coinciding and being shaped and adapted to each other in such manner that when they are connected they will form a pointed end, substantially as represented, that will project beyond the point of the fixed divider and penetrate between the stalks of grain and wedge them apart and divide them by deflecting or bending them laterally toward and from the swath.

If it should be preferred to give to either the fixed or removable dividers, or to both, a different form, that can readily be done, as my invention is irrespective of the form of either, provided the large or removable one can be adapted to the small or fixed one, so that they can be connected and disconnected at will.

The horizontal wedge or board $r$ is fitted at its rear end to the front end of a shield or guard-board, $h$, which overlies the wheel or runner at the outer or left end of the machine to prevent the cut grain from falling over the end of the platform or becoming entangled with the wheel or runner. This guard-board will be more or less inclined toward the platform, according to the height of the wheel and the angle which the left end of the platform forms with the finger-bar. The angle of the shield board will also be varied according to the particular views of each constructor, and as it is desirable that there should not be any abrupt break on the side next the platform, between the rear end of the wedge and the front end of the guard-board $h$, it will be necessary to incline the edge transversely in order to meet the board properly, or else it will be necessary to insert an intermediate connecting-piece with the proper twist or shape to make a smooth connection between the two, in which case I should prefer to make the wedge horizontal transversely as well as longitudinally, because it would not require as wide a board to make a wedge capable of opening or dividing the grain a given width, as if the board were inclined. The operation and effect of the wedge as a divider would, however, be the same, whether inclined transversely or not.

Figure 6:
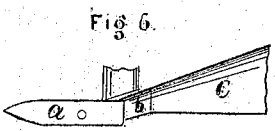
Figure 7:
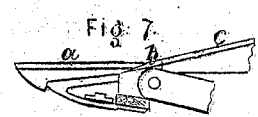
Figure 7:
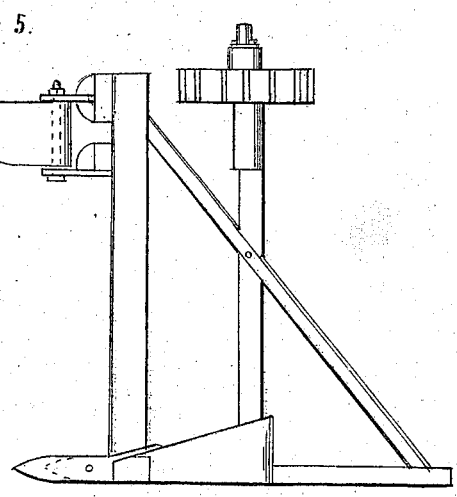

A wedge, $a$, placed horizontally in both directions and connected by an intermediate twisted piece, $b$, with an inclined guard, $c$, is shown in Figs. 6 and 7.

This double divider has a peculiar adaptation to my improved harvester, which is so constructed that by slight preparation and adjustments it is adapted equally well to either mowing or reaping, as a large or extensive divider would be very cumbersome and objectionable in various ways when the machine is used as for mowing grass, when the fixed divider is all that is required.

In transporting the machine to a distance it can be packed up more completely by removing the large divider and fastening it to the platform.

What I claim as my invention, and desire to secure by Letters Patent, is—

The combination of a removable auxiliary divider with a fixed divider, substantially as herein set forth.

In testimony whereof I have hereunto subscribed my name.

JOHN H. MANNY.

Witnesses:
P. H. WATSON,
F. G. DE FONTAINE.